United States Patent
Groth et al.

[11] Patent Number: 5,998,504
[45] Date of Patent: Dec. 7, 1999

[54] COLLOIDAL METAL OXIDES HAVING BLOCKED ISOCYANATE GROUPS

[75] Inventors: Stefan Groth, Leverkusen; Claus Kobusch, Meerbusch; Lutz Schmalstieg, Köln; Lothar Puppe, Burscheid; Theodor Engbert, Köln; Manfred Bock, Leverkusen; Gerhard Jonschker, Spiesen-Elversberg, all of Germany

[73] Assignee: Bayer Aktiengesellschaft, Leverkusen, Germany

[21] Appl. No.: 09/054,590

[22] Filed: Apr. 3, 1998

[30] Foreign Application Priority Data

Apr. 14, 1997 [DE] Germany ............... 197 15 426

[51] Int. Cl.$^6$ .......................... C08K 5/54; C07B 37/02
[52] U.S. Cl. .................. 523/213; 524/262; 524/431; 524/790; 106/490; 556/418; 556/420; 556/421
[58] Field of Search ............... 523/213; 524/262, 524/431, 790; 106/490; 556/418, 420, 421

[56] References Cited

U.S. PATENT DOCUMENTS

| | | | |
|---|---|---|---|
| 3,790,527 | 2/1974 | Merrill | 260/46.5 R |
| 3,887,514 | 6/1975 | Merrill | 260/33.6 SB |
| 4,006,271 | 2/1977 | French et al. | 427/164 |
| 4,153,764 | 5/1979 | Blount | 521/155 |
| 4,243,720 | 1/1981 | Schroeter et al. | 428/412 |
| 4,278,804 | 7/1981 | Ashby et al. | 556/436 |
| 4,419,405 | 12/1983 | Ashby et al. | 428/412 |
| 4,476,281 | 10/1984 | Vaughn, Jr. | 524/767 |
| 4,624,870 | 11/1986 | Anthony | 427/387 |
| 4,680,232 | 7/1987 | Factor et al. | 428/412 |
| 5,013,770 | 5/1991 | Carpenter et al. | 523/213 |
| 5,081,200 | 1/1992 | Yamaya et al. | 528/18 |
| 5,270,352 | 12/1993 | Carpenter et al. | 428/405 |

FOREIGN PATENT DOCUMENTS 1011154  1/1989  Japan ...................... 524/262

*Primary Examiner*—Andrew E. C. Merriam
*Attorney, Agent, or Firm*—Joseph C. Gil; Thomas W. Roy

[57] ABSTRACT

The present invention relates to colloidal metal oxides having blocked isocyanate groups, which are based on the reaction product of A) blocked isocyanate group-containing silanes corresponding to formula (I)

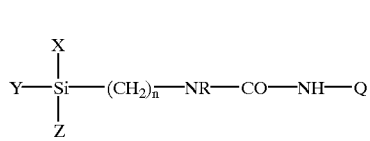

wherein
R represents hydrogen or an organic group having 1 to 40 carbon atoms,
X, Y and Z represent identical or different organic groups having 1 to 30 carbon atoms which are inert to isocyanate groups below 100° C., provided that at least one of these groups is a $C_1$–$C_4$-alkoxy group,
Q represents an organic group which contains at least one isocyanate group reacted with a blocking agent and
n is 2, 3 or 4 with B) colloidal metal oxides selected from Al, Si, Ti, Ta, W, Hf, Zr, Sn and Y.

The present invention also relates to the use of modified metal oxides, either alone or in combination with compounds containing at least two isocyanate-reactive groups, for the preparation of optionally expanded polyurethane plastics, lacquers or coating agents.

18 Claims, No Drawings

COLLOIDAL METAL OXIDES HAVING BLOCKED ISOCYANATE GROUPS

BACKGROUND OF THE INVENTION

1. Field of the Invention

The present invention relates to colloidal metal oxides with blocked isocyanate groups and their use for producing scratch-resistant coatings on any substrate.

2. Description of the Prior Art

There is a large demand for scratch-resistant coatings for sensitive surfaces, in particular thermoplastic materials. These materials are characterized by high impact strength, transparency and dimensional stability, but only have very low resistance to scratching and to chemicals.

Thermally curing silicone lacquers, which preferably crosslink by a condensation reaction to give Si—O—Si linkages, are mainly used to improve the scratch resistance of thermoplastic materials. In addition to this type of crosslinking, other crosslinking mechanisms may also be used. These coating compositions are often based on partial hydrolysis-condensation products of alkyl or aryltrialkoxysilanes which are usually combined with colloidal silica sols. These coating compositions are described, for example, in U.S. Pat. Nos. 3,790,527, 3,887,514, 4,243,720, 4,278,804, 4,419,405, 4,624,870, 4,680,232, 4,006,271, 4,476,281, in DE-A 4,011,045, 4,122,743, 4,020,316, 3,917,535, 3,706,714, 3,407,087, 3,836,815, 2,914,427, 3,135,241, 3,134,777, 3,100,532, 3,151,350 and in DE-A 3,005,541, 3,014,411, 2,834,606, 2,947,879, 3,016,021.

These coatings often have only low elasticity which means they can only be applied in thin layers of less than 10 $\mu$m. In addition, due to the small proportion of organic compounds, they are incompatible with organic binders and have poor adhesion, which in most cases requires the application of a primer. In addition, a long baking time is often required for the condensation crosslinking reaction, which may take several hours depending upon the thermal sensitivity of the substrate.

An object of the present invention is to provide an elastic, scratch resistant coating composition, which can be applied in thick layers and has good adhesion to the substrate without the use of a primer. It is an additional object of the present invention to obtain these properties without having to accept a deterioration in other properties, such as scratch resistance and chemical resistance.

Surprisingly, these objects can be achieved with the colloidal metal oxides having blocked isocyanate groups described hereinafter. These compositions can be used to provide hard, scratch resistant coatings having a high resistance to chemicals and outstanding adhesion to the substrate without a primer. The compositions may be applied using conventional baking techniques for blocked isocyanates.

SUMMARY OF THE INVENTION

The present invention relates to colloidal metal oxides having blocked isocyanate groups, which are based on the reaction product of A) blocked isocyanate group-containing silanes corresponding to formula (I)

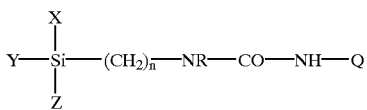

wherein
R represents hydrogen or an organic group having 1 to 40 carbon atoms,
X, Y and Z represent identical or different organic groups having 1 to 30 carbon atoms which are inert to isocyanate groups below 100° C., provided that at least one of these groups is a $C_1$–$C_4$-alkoxy group,
Q represents an organic group which contains at least one isocyanate group reacted with a blocking agent and
n is 2, 3 or 4 with B) colloidal metal oxides selected from Al, Si, Ti, Ta, W, Hf, Zr, Sn and Y.

The present invention also relates to the use of modified metal oxides, either alone or in combination with compounds containing at least two isocyanate-reactive groups, for the preparation of optionally expanded polyurethane plastics, lacquers or coatings.

DETAILED DESCRIPTION OF THE INVENTION

Preferred compounds according to the invention are those corresponding to formula (I) wherein R represents a linear or branched $C_1$–$C_{20}$-alkyl group or a group corresponding to the formula

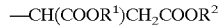

wherein
$R^1$ and $R^2$ are the same or different and represent organic groups which are inert to isocyanate groups below 100° C. and wherein the total number of carbon atoms in the preceding formula falls within the definition of R, preferably $C_1$–$C_8$-alkyl or $C_6$–$C_{14}$-aryl-alkyl organic groups, more preferably alkyl groups having 1 to 4 carbon atoms, and most preferably both groups are the same and represent methyl or ethyl groups.

These compounds have a low tendency to crystallize and, thus, have the advantage that it is possible to prepare them in a controlled manner without the use of a solvent. The starting compounds in this case are preferably polyisocyanates and aspartates corresponding to formula (II)

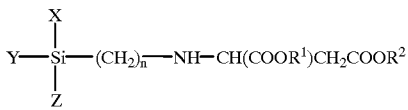

wherein
$R^1$ and $R^2$ are as defined above,
X represents an alkoxy group having 1 to 4 carbon atoms, more preferably methoxy or ethoxy,
Y and Z are the same or different and represent organic groups having 1 to 30 carbon atoms which are inert to isocyanate groups below 100° C., preferably alkyl or alkoxy groups having 1 to 4 carbon atoms, more preferably methoxy or ethoxy, and most preferably Y and Z are the same as X, and n is 2, 3 or 4. preferably 3.

The synthesis of these compounds is described, for example, in EP-A 596,360 (U.S. Pat. No. 5,364,955, herein incorporated by reference). Depending on the reaction temperature, hydantoin production may also take place with the elimination of an alcohol as described, for example, in U.S. Pat. No. 3,549,599.

Colloidal metal oxides are used in accordance with the present invention. The expression "colloidal metal oxide" includes a wide variety of finely divided oxides of the elements aluminum, silicon, titanium, zirconium, tantalum, tungsten, hafnium, zirconium, tin and yttrium in any solvent.

Colloidal silicon oxide is preferably used. This is generally a dispersion of silicon dioxide ($SiO_2$) particles of submicron size in an aqueous medium or some other solvent. Colloidal silicon oxide is obtainable in many different forms. Organic solutions of silica sols are preferably used. These are generally 30–40% solutions of colloidal silicon oxide in isopropanol having a water content of <1% and an average particle size of 10–12 nm.

Aqueous solutions of colloidal silicon oxide may also be used. In accordance with the present invention, acid forms (i.e., dispersions with a low sodium content) are preferably used. Alkaline colloidal silicon oxide can be converted into acidic colloidal silicon oxide by acidification. Suitable aqueous acid colloidal silicon oxides include Nalcoag 1034A, obtainable from the Nalco Chemical Co., Chicago, Ill. Nalcoag 1034A is a very pure, aqueous, acid dispersion of colloidal silicon oxide having a low Na content, a pH of 3.1 and a $SiO_2$ content of 34 wt. %. LUDOX TMA from DuPont, which also has a pH of 3.1 and a $SiO_2$ content of 34 wt. %, may also be used.

The blocked isocyanate group-containing silanes of formula (I) may be prepared by reacting amino-functional alkoxysilyl compounds corresponding to formula (III)

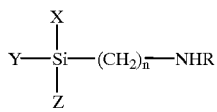
(III)

wherein n is 2, 3 or 4. preferably 3, and

R represents hydrogen or, preferably, a linear or branched alkyl group having 1 to 4 carbon atoms.

Examples of amino-functional alkoxysilyl compounds which can be used include 3-aminopropyltrimethoxysilane, 3-aminopropyltriethoxysilane and 3-aminopropyl-methyl-diethoxysilane. Examples of alkoxysilyl compounds with secondary amino groups, which are preferably used, include N-methyl-3-aminopropyltrimethoxysilane, N-butyl-3-aminopropyltrimethoxysilane and N-phenyl-3-aminopropyltrimethoxysilane.

Amino-functional alkoxysilyl compounds which are more preferred according to the invention are aspartates the previously described aspartates corresponding to formula (II), described in EP-A 596,360:

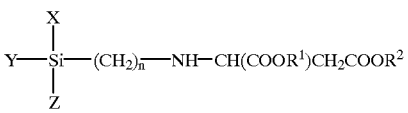
(II)

wherein $R^1$, $R^2$, X, Y, Z and n are as defined above.

These compounds are segments between the inorganic portion and the polyurethane portion, which enables the reaction with isocyanates to proceed in an easily controllable reaction without (as is the case for example with aminosilanes) insoluble urea being produced. Depending on the reaction conditions, hydantoin production may occur, with the elimination of an alcohol, as is described in U.S. Pat. No. 3,549,599.

Examples compounds corresponding to formula (II) include diethyl N-(3-trimethoxysilyl-propyl)aspartate, diethyl N-(3-triethoxysilylpropyl)-aspartate, dimethyl N-(3-trimethoxysilylpropyl)-aspartate, dimethyl N-(3-triethoxysilylpropyl)aspertate, dibutyl N-(3-trimethoxysilylpropyl)aspartate and dibutyl N-(3-triethylxysilylpropyl)aspartate. Preferred compounds include dimethyl N-(3-trimethoxysilylpropyl)aspartate, dimethyl N-(3-triethoxysilyl-propyl)aspartate, diethyl N-(3-trimethoxysilylpropyl)aspartate and diethyl N-(3-triethoxysilylpropyl)-aspartate.

The compounds according to the invention may also be used in combination with hydrolyzable silanes, preferably those corresponding to formula (IV):

(IV)

wherein

Q represents the same or different groups selected from hydrogen, halogen, $C_1$–$C_4$-alkoxy, $C_1$–$C_4$-acyloxy, $C_1$–$C_4$-alkylcarbonyl or the group $NR^4_2$, $R^3$ represents identical or different groups selected from hydrogen, $C_1$–$C_4$-alkyl, $C_2$–$C_6$-alkenyl, $C_2$–$C_6$-alkynyl, $C_6$–$C_{24}$-aryl, $C_7$–$C_{30}$-arylalkyl, $C_8$–$C_{30}$-arylalkylene, $C_8$–$C_{30}$-alkenylaryl, $C_8$–$C_{30}$-arylalkynyl or $C_8$–$C_{30}$-alkynylaryl group, the carbon chain may be interrupted by oxygen, sulphur or the group $NR^4$ and/or may contain one or more substituents, $R^4$ represents hydrogen or a $C_1$–$C_4$-alkyl group and m is 1, 2 or 3.

Suitable substituents for $R^3$ include halogen, amino, amide, aldehyde, keto, alkylcarbonyl, carboxy, mercapto, cyano, hydroxy, alkoxy, alkoxycarbonyl, sulphonic acid, phosphoric acid, acryloxy, methacryloxy, epoxy or vinyl groups.

The hydrolyzable silanes may be present in an amount of 25 to 95 mole %, based on the total number of moles of starting components. The hydrolyzable silanes may also be present in the form of their oligomers.

Examples of hydrolyzable silanes include tetramethoxysilane, tetraethoxysilane, methyltrichlorosilane, methyltrimethoxysilane, methyltriethoxysilane, ethyltrichlorosilane, ethyltriethoxysilane, isobutyltrimethoxysilane, octyltrimethoxysilane, octyltriethoxysilane, octadecyltrimethoxysilane, vinyltriethoxysilane, vinyl-tris-(2-methoxyethoxy)silane, vinyltrichlorosilane, allyltrimethoxysilane, allyltriethoxysilane, propyltrimethoxysilane, phenyltrimethoxysilane, phenyltriethoxysilane, dimethyldichlorosilane, dimethyldimethoxysilane, dimethyldiethoxysilane, diphenyldichlorosilane, diphenyidimethoxysilane, diphenyldiethoxysilane, t-butyldimethylchlorosilane, allyldimethylchlorosilane, 3-chloropropyl-trimethyoxysilane, 3-cyanopropyl-trimethoxysilane, 3-(trimethoxysilyl)-propyl methacrylate, 3-[2,3-epoxy-propoxy)-propyl]-trimethoxysilane, 3-[2,3-epoxy-propoxy)-propyl]-triethoxysilane, 3-aminopropyl-trimethoxysilane, 3-aminopropyl-triethoxysilane, 3-aminopropyl-methyldiethoxysilane, 3-aminopropyl-methyidimethoxysilane, N-[3-(tri-methoxysilyl)-propyl]-ethylene diamine, 1N-[3-(trimethoxysilyl)-propyl]-diethylene triamine, [2-(3,4-epoxycyclohexyl)-ethyl]-trimethoxysilane, N-(3-trimethoxysilyl-propyl)-aniline, bis-(3-trimethoxysulyl-propyl)-amine, 3-mercaptopropyl-trimethoxysilane and N-(3-trimethoyxysily-propyl)-urea.

These and other silanes are described in W. Noll "Chemie und Technologie der Silicone", Verlag Chemie GmbH, Weinheim/Bergstraβe (1968).

Suitable polyisocyanates for preparing the modified colloidal metal oxides according to the invention include any compounds containing isocyanate groups. Preferred are the known diisocyanates described, for example, in "Methoden der organischen Chemie" (Houben-Weyl), vol. 14/2. Georg Thieme Verlag, Stuttgart, 1963. pages 61 to 70 and by W. Siefkin in Liebigs Annalen der Chemie 562, pages 75 to 136. These diisocyanates include 4,4'-diisocyanatodicylcohexylmethane, 3-isocyanatomethyl-3,3,5-trimethylcyclohexyl isocyanate (isophorone diisocyanate or IPDI), tetramethylene diisocyanate, hexamethylene diisocyanate (HDI), 2-methyl-pentamethylene diisocyanate, 2,2,4-trimethylhexamethylene diisocyanate (THDI), dodecamethylene diisocyanate, 1,4-diisocyanato-cyclohexane, 4,4'-diisocyanato-3,3-dimethyl-dicylcohexylmethane, 4,4'-diisocyanato-dicyclohexylpropane-(2,2), 3-isocyanatomethyl-1-methyl-1-isocyantatocyclohexane (IMCI), 1,3-diisocyanato-4-methylcyclohexane, 1,3-diisocyanato-2-methylcyclohexane, and α,α,α',α'-tetramethyl-m- or -p-xylylene diisocyanate (TMXDI). Also suitable are commercially available aromatic diisocyanates or mixtures thereof, such as 2,4 and 2,6-diisocyantotoluene or 4,4'- and optionally 2,4'-diisocyanatodiphenylmethane, 3,4'-diisocyanato-4-methyldiphenylmethane and their isomers or mixtures of these isomers. Phenylene diisocyanates which are sterically hindered by alkyl substituents, such as 1-methyl-3,5-diethyl-2,4-diisocyanatobenzene and/or 1-methyl-3,5-diethyl-2,6-diisocyanatobenzene, 1,3,5-triisopropyl-2,4-diisocyanatobenzene and alkyl substituted phenylene diisocyanates, e.g., those described in U.S. Pat. No. 3,105,845 or DE-A 3,317,649, may also be used.

Especially preferred for use according to the invention are 4,4'-diisocyanatodicyclohexylmethane, 3-isocyanatomethyl-3,3,5-trimethylcyclo-hexyl isocyanate (isophorone dilsocyanate or IPDI), tetramethylene diisocyanate, hexamethylene diisocyanate (HDI), 2-methyl-pentamethylene diisocyanate, 2,2,4-trimethylhexamethylene diisocyanate (THDI), dodecamethylene diisocyanate, 1,4-diisocyanato-cyclohexane, 4,4'-diisocyanato-3,3'-dimethyl-dicyclohexylmethane, 4,4'-diisocyanatodicyclohexyl-propane-(2,2), 3- or 4-isocyanato-1-methyl-1-isocyanato-cyclohexane (IMCI), 4-isocyanatomethyl-1,8-diisocyanato-octane, 1,3-diisocyanato-4-methyl-cyclohexane, 1,3-diisocyanato-2-methyl-cyclohexane, α,α,α',α'-tetramethyl-m- or -p-xylylene diisocyanate (TMXDI) and mixtures thereof. Hexamethylene diisocyanate (HDI) is particularly preferred.

Other suitable polyisocyanates are those described, for example, in J. prakt. Chem. 1994, 336, 185–200.

Other compounds which may be chemically incorporated in the compounds according to the invention are the known compounds from polyurethane chemistry which react with isocyanate groups. Examples include polyester polyols, polycarbonate polyols, polyether polyols and low molecular weight diols such as ethylene glycol, propylene glycol, 1,4 and 1,3-butanediol, 1,6-hexanediol, 1,8-octanediol, neopentyl glycol, 2-methyl-1,3-dihydroxypropane, glycerine, trimethylolpropane, diethylene glycol, triethylene glycol, tetraethylene glycol, polyethylene glycol, dipropylene glycol, tripropylene glycol and mixture thereof.

Blocking agents are used to block the isocyanate groups according to the invention. The isocyanate groups, which are subsequently used in the crosslinking reaction, are protected from the solvent media, which is reactive with isocyanate groups by this step.

Suitable blocking agents are those with preferably one group capable of reacting with isocyanate groups by an addition reaction. Suitable blocking agents include secondary or tertiary alcohols such as isopropanol and t-butanol; CH-acidic compounds such as diethyl malonate, acetylacetone and ethylacetoacetate; oximes such as formaldoxime, acetaldoxime, methylethylketoxime, cyclohexanonoxime, acetophenonoxime, benzophenonoxime and diethyleneglyoxime; lactams such as caprolactam, valerolactam and butyrolactam; phenols such as phenol and o-methylphenol; N-alkylamides such as N-methylacetamide; imides such as phthalimide; secondary amines such as diisopropyl-amine; imidazole; pyrazole; 3,5-dimethylpyrazole; 1,2,4-triazole; and 2,5-dimethyl-1,2,4-triazole.

Preferred blocking agents include butanonoxime, 3,5-dimethyl pyrazole, caprolactam, diethyl malonate, dimethyl malonate, ethyl acetoacetate, 1,2,4-triazole and imidazole. More preferred are blocking agents which have a low unblocking temperature such as diethyl malonate, dimethyl malonate, butanonoxime and 3,5-dimethylpryazole, especially the latter blocking agent because has a reduced tendency to yellow.

Preparation of the compounds according to the invention may be performed by various embodiments. The preferred embodiment is to react an alkoxysilyl-functional prepolymer with the colloidal metal oxide in an alcoholic solution with the addition of water and optionally catalysts. In this case, a prepolymer is first prepared from a polyisocyanate or a polyisocyanate mixture, the alkoxysilyl-functional amine, a blocking agent and optionally an isocyanate-reactive chain-extender, which have previously been described. The prepolymer is prepared by adding the blocking agent and the alkoxysilyl-functional amine to the optionally pre-extended polyisocyanate.

Preferably, the prepolymer is prepared by reacting 0.1 to 0.9 NCO equivalents, preferably 0.3 to 0.7 NCO equivalents, with the blocking agent at 0 to 100° C., preferably 20 to 70°C., and then reacting the remaining NCO groups with the alkoxysilyl-functional amine at 0 to 80° C., preferably 20 to 70° C. It is also possible to initially react the optionally pre-extended polyisocyanate with the alkoxysilyl-functional amine and then with the blocking agent, or to react the polyisocyanate with a mixture of the two components.

Any solvent may be used. The use of alkoxysilyl-functional aspartates has proved to be advantageous because the reaction then proceeds under readily controllable conditions, especially in the absence of a solvent. The formation of hydantoin production, which in certain cases may be an advantage, may also take place, especially at elevated temperatures of above 60° C.

The preparation of the modified colloidal metal oxide may be performed by mixing the prepolymer mentioned above with the dissolved colloidal metal oxide and optionally the silane. If a metal oxide in an organic solvent is used, then at least enough water must be added for hydrolysis of the alkoxysilyl groups to take place. If aqueous colloidal metal oxide solutions are used, then at least enough organic solvent must be added for the prepolymer to dissolve. It has been shown that in accordance with the present invention at least 20% of a secondary alcohol must be added in order to avoid gel formation.

A catalyst may optionally be added to accelerate the reaction. The addition of acids such as hydrochloric acid, sulphuric acid or trifluoroacetic acid is preferred. To complete the reaction, the mixture may be stirred for a long time at room temperature or it may also be heated under reflux. To increase the solids content, excess solvent and/or water may be removed by distillation.

The solutions of colloidal metal oxides which contain blocked isocyanate groups may be combined with any compounds containing at least two isocyanate-reactive groups. The amounts of the reactants are selected such that the equivalent ratio of blocked isocyanate groups to isocyanate-reactive groups is 0.5 to 1.5. preferably 0.8 to 1.2. The hardeners according to the invention may also be incorporated into any formulations which contain isocyanate-reactive groups.

The colloidal metal oxides with blocked isocyanate groups may also be used alone (i.e., in the absence of an isocyanate-reactive component) to provide scratch resistant coatings on any substrate. The coating compositions obtained may be used to coat any substrate to improve the resistance to scratching, to abrasion or to chemicals. Preferred substrates are thermoplastics such as polycarbonate, polybutylene terephthalate, polymethylmethacrylate, polystyrene or polyvinyl chloride, preferably polycarbonate. The coating composition may be applied by any process such as immersion, spraying or casting. Curing is performed by heating under the conditions sufficient to unblock the blocked isocyanates and may be accelerated by adding suitable catalysts.

The invention is further illustrated but is not intended to be limited by the following examples in which all parts and percentages are by weight unless otherwise specified.

EXAMPLES

Preparation of colloidal metal oxides with blocked isocyanate groups:

Example 1

84 g (0.5 mol) of hexamethylene diisocyanate were initially introduced and first with 48 g (0.5 mol) of 3,5-dimethylpyrazole. Then 176 g (0.5 mol) of diethyl N-(3-trimethoxysilylpropyl)-aspartate (prepared in accordance with EP 596,360 (U.S. Pat. No. 5,364,955, example 5) were added dropwise at 50° C. 2050 g of a 29.3% strength colloidal solution of silicon oxide in isopropanol (Organosol, available from Bayer AG) were added to the prepolymer at 50° C. and cooled to room temperature. 20 g of water were added, the pH was adjusted to 3.1 with trifluoroacetic acid and the mixture was stirred for 48 hours at room temperature. To partly exchange isopropanol for a higher boiling solvent, 1457 g of methoxypropyl acetate were added and the solids content was adjusted to 56% by distillation under reduced pressure at 40° C. and 70 mbar. The solution of the modified colloidal metal oxide had a blocked isocyanate content of 1.29%.

Example 2

84 g (0.5 mol) of hexamethylene diisocyanate were initially introduced and reacted with 48 g (0.5 mol) of 3,5-dimethylpyrazole. Then 176 g (0.5 mol) of diethyl N-(3-trimethoxysilylpropyl)-aspartate were added dropwise at 50° C. 2050 g of the colloidal solution of silicon oxide described in Example 1 were added to the prepolymer at 50° C. and cooled to room temperature. 20 g of water were added, the pH was adjusted to 3.1 with trifluoroacetic acid and the mixture was stirred for 48 hours at room temperature. Isopropanol was then distilled off at 70 mbar until the solids content was 53%. The solution had a blocked isocyanate content of 1.23%.

Example 3

84 g (0.5 mol) of hexamethylene diisocyanate were initially introduced and reacted with 48 g (0.5 mol) of 3,5-dimethylpyrazole. Then 176 g (0.5 mol) of diethyl N-(3-trimethoxysilylpropyl)-aspartate were added dropwise at 50° C. 2563 g of the colloidal solution of silicon oxide described in Example 1 were added to the prepolymer at 50° C. and cooled to room temperature. 20 g of water were added, the pH was adjusted to 3.1 with trifluoroacetic acid and the mixture was stirred for 48 hours at room temperature. Isopropanol was then distilled off at 70 mbar until the solids content was 55%. The solution had a blocked isocyanate content of 1.03%.

Example 4

111 g (0.5 mol) of isophorone diisocyanate were initially introduced and first reacted with 48 g (0.5 mol) of 3,5-dimethylpyrazole. Then 176 g (0.5 mol) of diethyl N-(3-trimethoxysilylpropyl)-aspartate were added dropwise at 50° C. 2050 g of the colloidal solution of silicon oxide described in Example 1 were added to the prepolymer at 50° C. and cooled to room temperature. 20 g of water were added, the pH was adjusted to 3.1 with trifluoroacetic acid and the mixture was stirred for 48 hours at room temperature. Isopropanol was then distilled off at 70 mbar until the solids content was 55%. The solution had a blocked isocyanate content of 1.23%.

Application Examples

Example 5

20 g of a caprolactone polyester (initiated with 1,6-hexanediol and having an average molecular weight of 400), 72 g of acetone, 1.7 g of dibutyltin dilaurate and 0.1%, based on solids of a flow control agent (Baysilone OL 17, available from Bayer AG) were added to 325 g of the blocked isocyanate from Example 1. The coating composition was applied by spraying onto a polycarbonate sheet (100×100×3 mm), which had been previously cleaned with isopropanol, in a wet film thickness of 50 $\mu$m. The thickness of the scratch resistant coating was 20 $\mu$m. Curing was performed by drying for 30 minutes at room temperature and then heating for one hour at 120° C.

Example 6

20 g of the caprolactone polyester described in Example 5, 1.8 g of dibutyltin dilaurate and 0.1%, based on solids, of the flow control agent described in Example 5 were added to 342 g of the blocked isocyanate from Example 2. The coating composition was applied by spraying onto a polycarbonate sheet (100×100×3 mm), which had previously been cleaned with isopropanol, in a wet film thickness of 60 μm. The thickness of the scratch resistant coating was 30 μm. Curing was performed by drying for 30 minutes at room temperature and then heating for six hours at 120° C.

Example 7

20 g of the caprolactone polyester described in Example 5, 92 g of acetone, 2.1 g of dibutyltin dilaurate and 0.1%, based on solids, of the flow control agent described in Example 5 were added to 409 g of the blocked isocyanate from Example 1. The coating composition was applied by spraying onto a polycarbonate sheet (100×100×3 mm), which had previously been cleaned with isopropanol, in a wet film thickness of 50 μm. The thickness of the scratch resistant coating was 20 μm. Curing was performed by drying for 30 minutes at room temperature and then heating for one hour at 120° C.

Example 8

20 g of the caprolactone polyester described in Example 5, 75 g of acetone as well as 1.8 g of dibutyltin dilaurate and 0.1%, based on solids, of the flow control agent described in Example 5 were added to 341 g of the blocked isocyanate from Example 1. The coating composition was applied by spraying onto a polycarbonate sheet (100×100×3 mm, Macrolon polycarbonate, available from Bayer AG), which had previously been cleaned with isopropanol, in a wet film thickness of 130 μm. The thickness of the scratch resistant coating was 40 μm. Curing was performed by heating for one hour at 120° C., after drying for 30 minutes at room temperature.

| Results: | | | | |
|---|---|---|---|---|
| Example | 5 | 6 | 7 | 8 |
| Drying RT/baking time 120° C. [min] | 30/60 | 30/360 | 30/60 | 30/60 |
| Thickness of layer μm | 20 | 30 | 20 | 40 |
| Scratch resistance | 1 | 2 | 1 | 2 |
| Resistance to ethyl acetate | 0 | 0 | 0 | 0 |
| Adhesion by cross-hatch test 1x/4x | 0/0 | 0/0 | 0/0 | 0/0 |
| König pendulum hardness DIN 53157 | 223 | 192 | 130 | 206 |

Scratch resistance evaluated by rubbing three times with a steel wool sample with fineness (0000):
0=no traces
1=hardly any trace
2=slightly scratched
3=moderately scratched
4=severely scratched
Resistance to chemicals determined using the effect of ethyl acetate:
0=no traces
1=marks remain
2=difficult to split
3=can be split
4=slightly swollen
5=swollen
Adhesion determined using the cross-hatch method, based on DIN 53 151:
0=no delamination up to 5=complete delamination.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A colloidal metal oxide having blocked isocyanate groups, which is based on the reaction product of
A) a blocked isocyanate group-containing silane corresponding to formula (I)

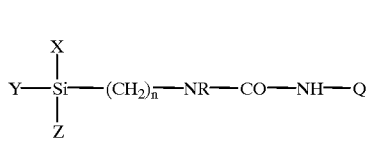

wherein
R represents hydrogen or an organic group having 1 to 40 carbon atoms,
X, Y and Z represent identical or different organic groups having 1 to 30 carbon atoms which are inert to isocyanate groups below 100° C., provided that at least one of these groups is a $C_1$–$C_4$-alkoxy group,
Q represents an organic group which contains at least one isocyanate group reacted with a blocking agent and
n is 2, 3 or 4 with
B) a colloidal metal oxide comprising a member selected from the group consisting of Al, Si, Ti, Ta, W, Hf, Zr, Sn and Y.

2. The colloidal metal oxide having blocked isocyanate groups of claim 1 wherein R represents a group corresponding to the formula

—CH(COOR$^1$)CH$_2$COOR$^2$ wherein
$R^1$ and $R^2$ are the same or different and represent alkyl groups having 1 to 4 carbon atoms.

3. The colloidal metal oxide having blocked isocyanate groups of claim 1 wherein
X represents an alkoxy group having 1 to 4 carbon atoms and
Y and Z are the same or different and represent alkyl or alkoxy groups having 1 to 4 carbon atoms.

4. The colloidal metal oxide having blocked isocyanate groups of claim 2 wherein
X represents an alkoxy group having 1 to 4 carbon atoms and
Y and Z are the same or different and represent alkyl or alkoxy groups having 1 to 4 carbon atoms.

5. The colloidal metal oxide having blocked isocyanate groups of claim 1 wherein
X, Y and Z represent methoxy or ethoxy groups and n is 3.

6. The colloidal metal oxide having blocked isocyanate groups of claim 2 wherein
X, Y and Z represent methoxy or ethoxy groups and n is 3.

7. The colloidal metal oxide having blocked isocyanate groups of claim 3 wherein
X, Y and Z represent methoxy or ethoxy groups and n is 3.

8. The colloidal metal oxide having blocked isocyanate groups of claim 4 wherein X, Y and Z represent methoxy or ethoxy groups and n is 3.

9. The colloidal metal oxide having blocked isocyanate groups of claim 1 wherein said colloidal metal oxide comprises Si.

10. The colloidal metal oxide having blocked isocyanate groups of claim 2 wherein said colloidal metal oxide comprises Si.

11. The colloidal metal oxide having blocked isocyanate groups of claim 3 wherein said colloidal metal oxide comprises Si.

12. The colloidal metal oxide having blocked isocyanate groups of claim 4 wherein said colloidal metal oxide comprises Si.

13. The colloidal metal oxide having blocked isocyanate groups of claim 5 wherein said colloidal metal oxide comprises Si.

14. The colloidal metal oxide having blocked isocyanate groups of claim 6 wherein said colloidal metal oxide comprises Si.

15. The colloidal metal oxide having blocked isocyanate groups of claim 7 wherein said colloidal metal oxide comprises Si.

16. The colloidal metal oxide having blocked isocyanate groups of claim 8 wherein said colloidal metal oxide comprises Si.

17. A coating composition for preparing scratch resistant coatings which comprises the colloidal metal oxide having blocked isocyanate of claim 1.

18. A coating composition for preparing scratch resistant coatings which comprises the colloidal metal oxide having blocked isocyanate of claim 1 and a compound containing isocyanate-reactive groups.

\* \* \* \* \*